(12) United States Patent
Steiger

(10) Patent No.: US 7,873,235 B2
(45) Date of Patent: Jan. 18, 2011

(54) FOG ISOLATION AND REJECTION FILTER

(75) Inventor: Reid Steiger, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1023 days.

(21) Appl. No.: 11/668,003

(22) Filed: Jan. 29, 2007

(65) Prior Publication Data

US 2008/0181535 A1    Jul. 31, 2008

(51) Int. Cl.
G06K 9/40 (2006.01)
G06K 9/42 (2006.01)
G06K 9/44 (2006.01)
G06K 9/56 (2006.01)
G06K 9/60 (2006.01)
G06T 11/00 (2006.01)
G09G 5/24 (2006.01)

(52) U.S. Cl. .................. 382/275; 382/257; 382/258; 382/259; 382/308; 345/469.1; 345/470

(58) Field of Classification Search .......... None
See application file for complete search history.

(56) References Cited

U.S. PATENT DOCUMENTS

| | | | |
|---|---|---|---|
| 5,909,244 A | 6/1999 | Waxman et al. | |
| 5,926,164 A | 7/1999 | Terakawa et al. | |
| 6,288,974 B1 | 9/2001 | Nelson | |
| 6,353,673 B1 | 3/2002 | Shnitser et al. | |
| 6,459,818 B1 | 10/2002 | George | |
| 6,674,900 B1 * | 1/2004 | Ma et al. | 382/176 |
| 7,116,800 B2 * | 10/2006 | Farmer | 382/103 |
| 2001/0021263 A1 * | 9/2001 | Oosawa | 382/132 |
| 2003/0068095 A1 | 4/2003 | George | |
| 2003/0095080 A1 | 5/2003 | Colmenarez et al. | |
| 2003/0169906 A1 * | 9/2003 | Gokturk et al. | 382/115 |
| 2005/0073682 A1 | 4/2005 | Narasimhan et al. | |
| 2005/0269481 A1 | 12/2005 | David et al. | |

OTHER PUBLICATIONS

Ming Zeng, Jianxun Li, and Zhang Peng, The Design of Top-Hat Morphological Filter and Application to Infrared Target Detection Institute of Information and Control, School of Information and Control Dec. 4, 2004 pp. 67-76—Shanghai Jiao Tong University, Shanghai 200030, China.

(Continued)

Primary Examiner—Anand Bhatnagar
Assistant Examiner—Randolph Chu
(74) Attorney, Agent, or Firm—Frank A. MacKenzie; Brooks Kushman P.C.

(57) ABSTRACT

An imaging processing system adapted for use with a vehicle is provided in one aspect of the present invention. The system generally includes an image capturing device and an image processing device. The image capturing device is operable to capture an original image of a scene exterior to the vehicle. The captured original image is generally defined by a group of pixels. The image processing device is operable to receive the captured original image and morphologically process the captured original image to remove distortion from the captured original image to produce a final filtered image.

20 Claims, 4 Drawing Sheets

OTHER PUBLICATIONS

B.S. Sathyaprakash, Varun Sahni, and Sergei Shandarin, Morphology of Clusters and Superclusters in N-Body Simulations of Cosmological Gravitational Clustering May 15, 1998 pp. 551-569.

R.S. Warwick1, J.-P. Bernard2, F. Bocchino3, A. Decourchelle4, P. Ferrando4, G. Griffiths1, F. Haberl5, La Palombara6, D. Lumb3, S. Mereghetti6, A.M. Read5, D. Schaudel5, N. Schurch1, A. Tiengo7, and R. Willingale1, The Extended X-Ray Halo of the Crab-like SNR G21.5-0.9 Oct. 2, 2000.

IMTOPHAT www.mathworks.com.

Milan Sonka, Vaclac Hlavac, and Roger Boyle, "Image Processing, Analysis, and Machine Vision, Second Edition", 1998, PWS Publishing, USA, XP002481156, p. 68-p. 74.

Nicolas Hautiere et al., Automatic fog detection and estimation of visibility distance through use of an onboard camera:, Machine Vision and Applications, Springer-Verlag, Be, vol. 17, No. 1, Apr. 1, 2006, 13 pages.

European Search Report, dated May 22, 2008, 10 pages.

* cited by examiner

FOG ISOLATION AND REJECTION FILTER

BACKGROUND

1. Technical Field

One or more embodiments of the present invention generally relate to processing images for use in a safety system of a vehicle.

2. Background Art

According to a 2004 report published by National Highway Transportation Safety Administration (NHTSA), approximately 23,000 persons were killed or injured in vehicle crashes while driving under extreme weather conditions. A number of these injuries or deaths may have occurred while driving in the presence of foggy conditions. The main factor for accidents in foggy weather conditions is reduced driver visibility of the road. New safety systems in vehicles today utilize vision based systems to detect objects in the road that may pose a collision threat to a vehicle and warn the driver of an impending collision. Since safety systems rely on various vision based systems to detect objects, such systems should be able to quickly identify whether an object posses a threat to the driver based on the image captured by the vision system, particularly when the vehicle is being operated in extreme weather conditions. Conventional approaches merely eliminate distortion in a captured image by decreasing contrast in the image. Such an approach produces a darker image and does not fully remove the distortion or noise generated in the captured image due the image being captured in extreme weather conditions.

Accordingly, it would be desirable to implement an image processing device that removes noise or distortion generated in a captured image due to the presence of rain, fog, sleet or any other element generated due to extreme weather conditions being present at the time the original image was captured.

SUMMARY

According to one embodiment of the present invention, an imaging processing system adapted for use with a vehicle is provided. The system generally includes an image capturing device and an image processing device. The image capturing device is operable to capture an original image of a scene exterior to the vehicle. The captured original image is generally defined by a group of pixels. The image processing device is operable to receive the captured original image and morphologically process the captured original image to remove distortion from the captured original image to produce a final filtered image.

According to another embodiment of the present invention, a method is provided for image processing a captured original image in a vehicle. The method generally captures the original image of a scene exterior to the vehicle and performs morphological image processing on the captured original image to remove distortion from the original image to produce a final filtered image.

According to another embodiment of the present invention, an imaging processing system is provided. The image processing system generally includes an image capturing device and an image processing device. The image capturing device is operable to capture an original image of a scene. The image processing device is operable to receive the captured original image and morphologically process the captured original image to remove distortion from the captured original image due to fog being present in the scene and captured in the original image to produce a final filtered image.

DETAILED DESCRIPTION OF THE EMBODIMENTS OF THE PRESENT INVENTION

Figure 1:
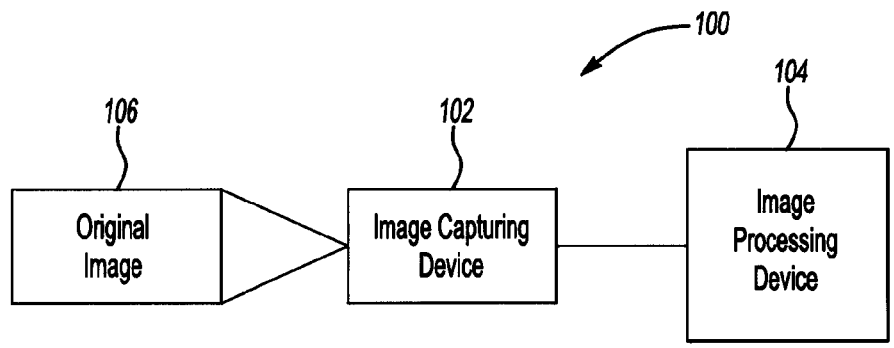
FIG. 1 illustrates a system in accordance to one embodiment of the present invention.

Referring to FIG. 1, a system 100 is shown in accordance to one embodiment of the present invention. The system 100 includes an image capturing device 102 and an image processing device 104. An original image 106 may be captured by the image capturing device 102 and transmitted to the image processing device 104 for image processing. The captured original image is defined by group of pixels. The image capturing device 104 generally includes one or more cameras (not shown). The one or more cameras may be positioned in predetermined locations of a vehicle. In general, the system 100 is configured to function as portion of an overall safety system associated with the vehicle. The system 100 may work in conjunction with Lane Departure Warning (LDW) systems, Forward Collision Warning (FCW) systems and/or Collision Mitigation by Braking (CMbB) systems. LDW, FCW and/or CmbB are systems configured to detect objects that may be approaching a vehicle and warn the driver in the case of an ensuing collision. The system 100 is configured to monitor the state of the road and provide for increased visibility of the road for the driver in the event of severe weather.

The original image may be an image related to a scene external to the vehicle. Such a scene may portray oncoming objects (e.g., including but not limited to other vehicles and pedestrians) that approach the vehicle. The image processing device 104 may be implemented within a safety controller (not shown). The safety controller may use the captured images for object classification and identification. For example, the safety controller may classify an oncoming object as a vehicle. Prior to the safety controller classifying the object in the image, some image processing may need to be performed on the captured original image to eliminate distortion and or noise.

The image processing device 104 is configured to perform morphological image processing on the captured image to remove distortion and/or noise from the captured original image. The image processing device 104 may use morphological image processing to remove distortion from the captured original image if the scene of the original image includes elements generated by weather conditions. In one non-limiting example, the image processing device 104 may use morphological image processing to remove distortion (or haze) from the captured original image if the scene of the original image includes fog. The image processing device 104 is used to isolate and reject haze in the captured original image due to the presence of fog in the original image. The image processing device 104 may be extended to remove distortion from the captured original image if the original scene includes rain, snow or mist. Morphological image processing generally incorporates top-hat filtering for removing distortion from the captured original image.

Figure 2:
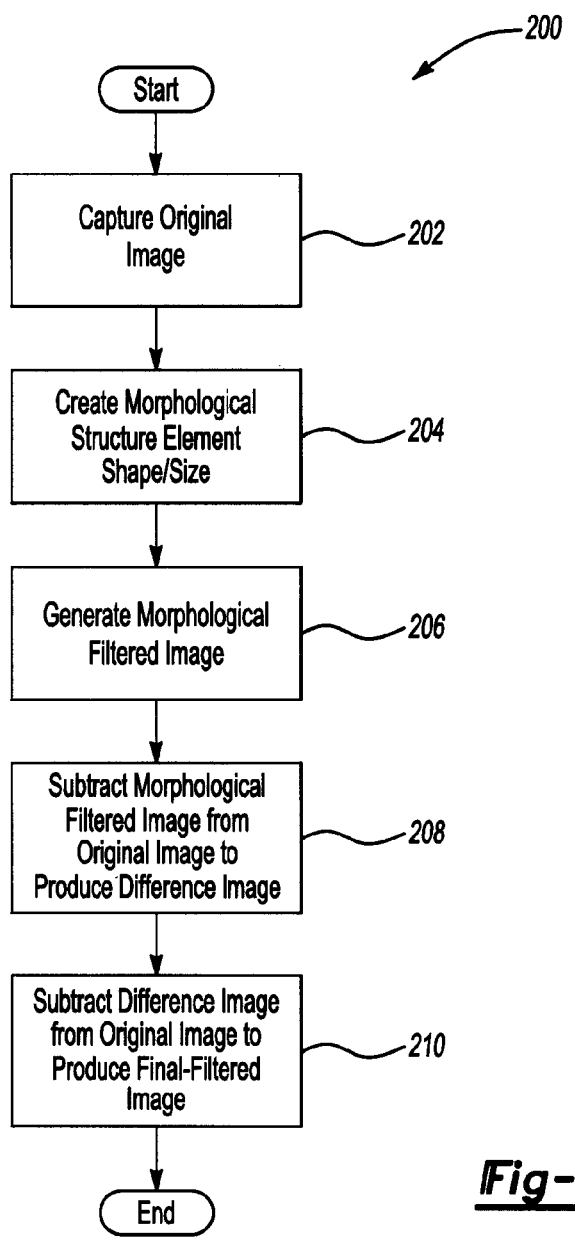
FIG. 2 illustrates a flow diagram for morphologically image processing a captured original image.

FIG. 2 illustrates a flow diagram 200 for morphologically image processing the captured original image. The image processing device 104 may employ the steps of diagram 200 for removing distortion from the captured original image. In the step 202, the image capturing device 102 captures the original image. In the step 204, a morphological structural element is defined. In one non-limiting example, the morphological structural element may be implemented in the form of a disc. The morphological structural element may also be implemented in the form of a circle, semi-circle or other shape. The size and shape of the structural element is generally based on the type of original image that is captured. The size and shape of the morphological structural element may be varied to meet the design criteria of a particular implementation. The morphological structural element is configured to encapsulate a sub group of pixels from the group of pixels which define the captured original image.

Figure 3:
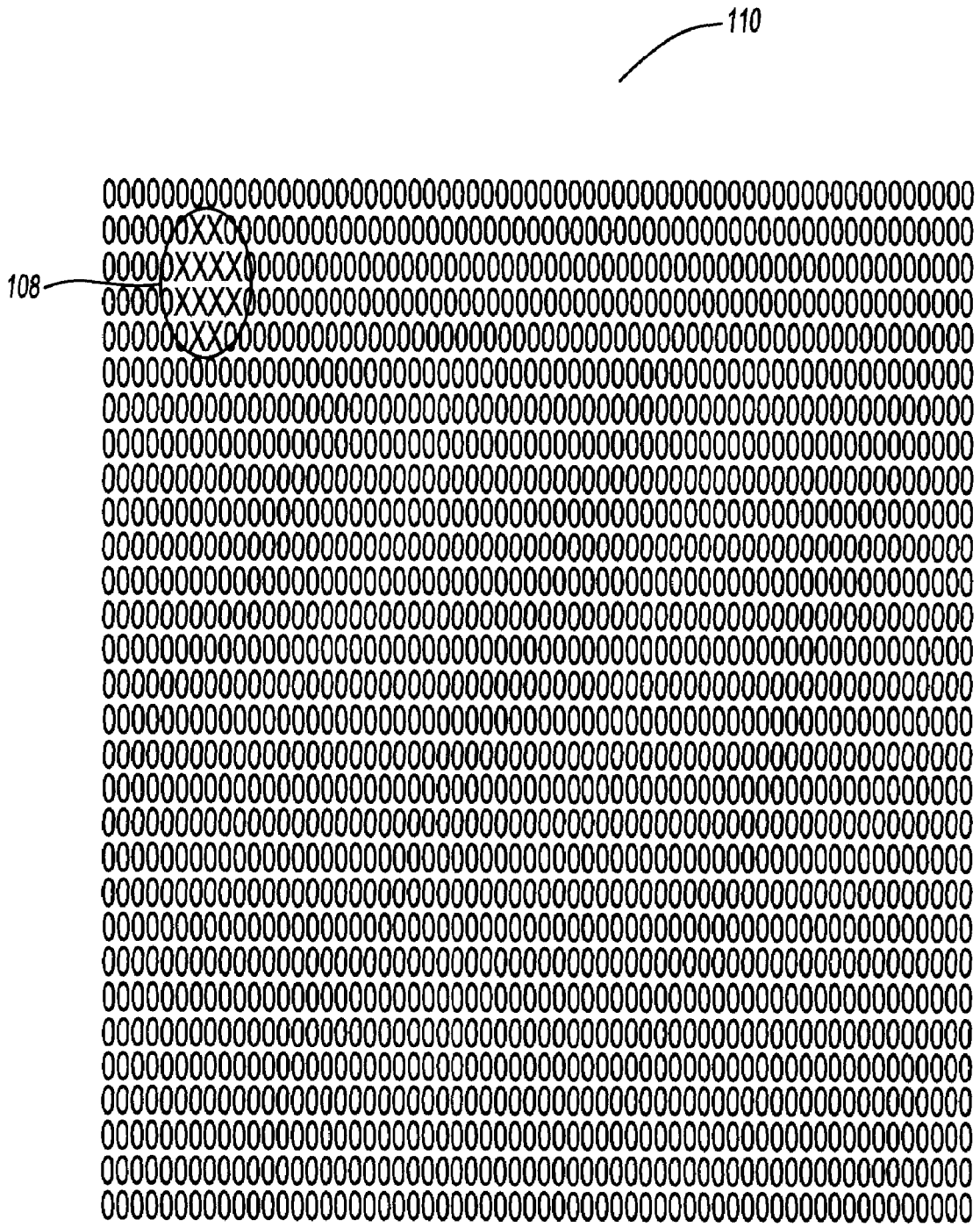
FIG. 3 illustrates a structural element surrounding a subgroup of pixels.

FIG. 3 generally illustrates the formation of a disc-shaped structural element 108 around a sub-group of pixels (labeled "X") from a group of pixels 110. Referring back to FIG. 2, in the step 206, the image processing device 104 generates a morphological filtered image. The image processing device 104 generates the morphological filtered image by comparing average pixel values of pixels that neighbor the structural element 108 to average pixels values of pixels located in the structural element 108 and employs top-hat filtering to discard pixels determined to be noise.

In general, each pixel has a value that is defined by $2^n$. For example, if the image capturing device 102 is configured to capture the original image 106 in color, then each pixel in the captured original image may include $2^{16}$ values (or 65,536 values), where n=16. In another example, if the image capturing device 102 captures the original image in grey-scale, then each pixel in the captured original image may include $2^8$ values (or 256 values), where n=8. The system 100 may be adapted to process and remove distortion for the captured original images that are in color or in grey-scale.

The image processing device 104 is configured to calculate average pixel values for any one or more pixels inside the structural element 108. The image processing device 104 calculates average pixel values for any one or more pixels that neighbor the structural element 108. If the average pixel values for the one or more pixels that neighbor the structural element 108 is greater than a predetermined average pixel threshold, the image processor 106 replaces the pixel with the average pixel value of the one or more pixels in the structural element 108. If the average pixel values for the one or more pixels that neighbor the structural element 108 is less than the predetermined average pixel threshold, the image processor 106 retains the pixel value associated with the one or more pixels neighboring the structural element 106. By discarding pixel values for pixels whose average is greater than the predetermined average pixel threshold, the system 100 may infer that such discarded pixels comprise a portion of the noise or distortion present in the captured original image. In the example of fog being present in the captured original scene, the system 100 may infer that the discarded pixels comprise a portion of the distortion or haze created due to the presence of fog in the captured original image. For pixels that have an average pixel value that is less than the predetermined average pixel threshold, the system 100 infers that such pixels are part of the true original image.

Once all of the neighboring pixels to the structural element 108 have been analyzed (e.g., the average pixel values have been compared to the predetermined average pixel threshold), the image processing device 104 shifts the structural element 108 over one or more columns and one or more of the new neighboring pixels to the structural element 108 are analyzed. Such a process of shifting the structural element 108 over the columns may resume until the entire image (or group of pixels 110 have been analyzed). In one non-limiting example, the scanning of the captured original image with the structural element 108 may begin at the top left hand portion of the captured original image and moved across the image. The initial position of the structural element 108 on the captured original image and the shift direction of the structural element 108 over the captured original image may be varied to meet the design criteria of a particular implementation. In response to shifting the structural element 108 across the entire image and analyzing neighboring pixels, the image processing device 104 generates the morphological filtered image. The morphological filtered image may present a more uniform image in comparison to the captured original image since the pixels whose average pixels values are greater than the predetermined average pixel threshold are replaced. Such a morphological filtered image generally presents a more uniform image. While the morphologically filtered image may present a uniform image, the filtered image may need additional processing since the image may be darker than the captured original image.

In the step 208, the image processor 106 may subtract the morphological filtered image from the captured original image to generate a difference image. The difference image is generally a cloudy image. The difference image generally represents a substantial amount of noise and/or distortion captured in the original image. In the example of fog being present in the original scene, the difference image represents a substantial amount of haze in the captured original image created due to the presence of fog in the scene. In the step 210, the image processor 106 may subtract the difference image from the captured original image to produce the final filtered image. By subtracting the difference image from the captured original image, a substantial amount of noise or all of the noise present in the captured original image may be eliminated.

Figure 4:
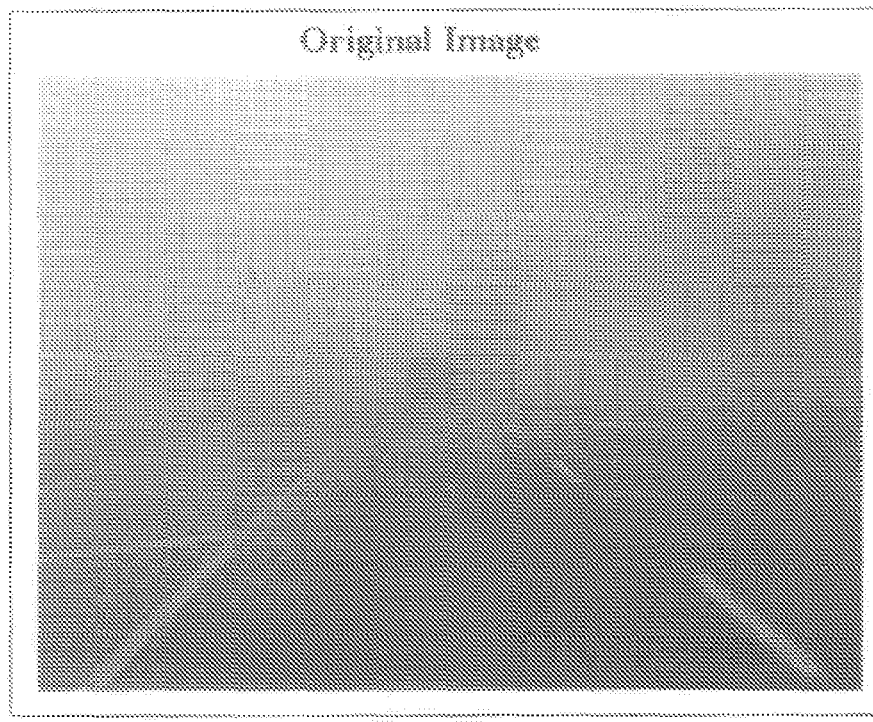
FIG. 4 illustrates an image that corresponds to the captured original image.

FIG. 4 illustrates an image that corresponds to the captured original image. The captured original image includes an object in the road. With the captured original image as shown in FIG. 4, it is difficult to ascertain that the object in the captured original image is a vehicle due to the noise generated in the captured original image due to the presence of fog.

Figure 5:
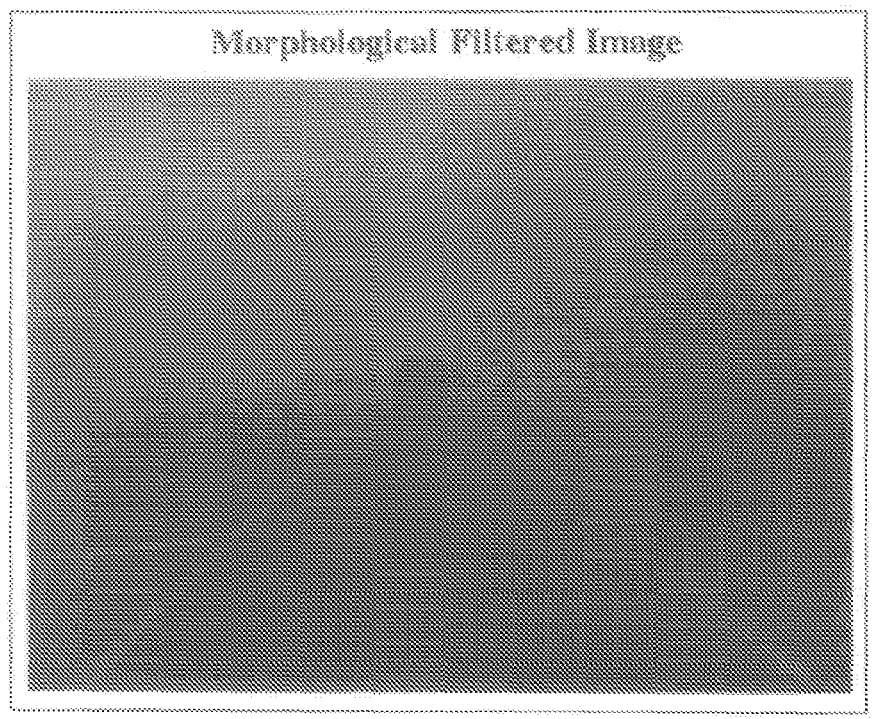
FIG. 5 illustrates an image that corresponds to a morphological filtered image.

FIG. 5 illustrates an image that corresponds to a morphologically filtered image. As noted in connection with FIG. 2, the morphological filtered image presents a more uniform appearance since the average pixels that are larger than the predetermined pixel value threshold are discarded. However, the morphological filtered image may have a darker contrast when compared to the captured original image shown in connection with FIG. 4. However, as illustrated with the morphological filtered image shown in FIG. 5, it may be easier to recognize that the object in the road is a vehicle when compared to the object in the road as illustrated in the captured original image of FIG. 4.

Figure 6:
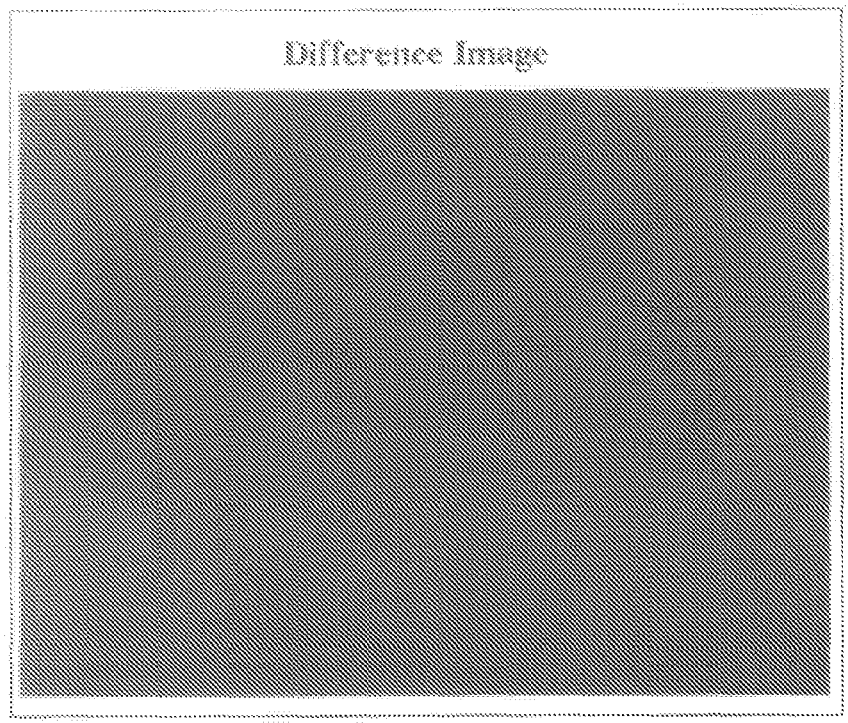
FIG. 6 illustrates an image that corresponds to a difference image.

FIG. 6 illustrates an image that corresponds to the difference image. The difference image generally represents a substantial portion of the noise or distortion that was created as a result of capturing the original image when fog was present.

Figure 7:
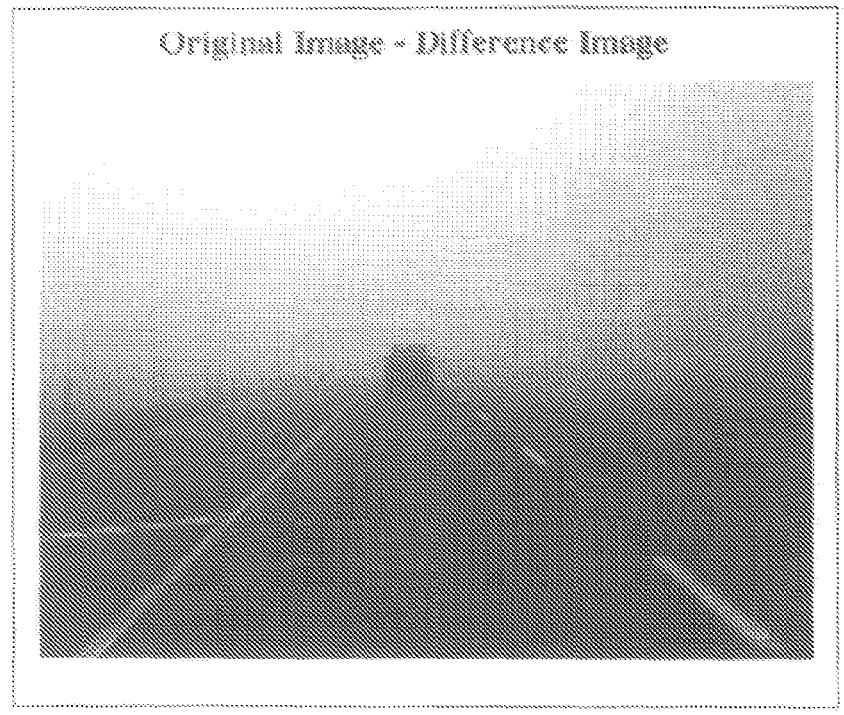
FIG. 7 illustrates an image that corresponds to a final filtered image.

FIG. 7 illustrates an image that corresponds to the final filtered image. The object in the road may be easily identifiable as a vehicle. In addition, the final filtered image provides for greater visibility and increased object definition when compared to the captured original image. By producing an image with increased object definition, the system 100 provides the driver with greater road visibility that may lead to a decrease in the likelihood of accidents occurring with the vehicle. For example, if weather conditions were so poor and a driver had relatively poor visibility, a safety system of the vehicle may warn the driver of an on-coming vehicle while in the presence of fog, rain, and sleet since the safety system may identify the presence of an object quicker than conventional methods due to the increased object definition provided by the system 100.

While the best mode for carrying out the invention has been described in detail, those familiar with the art to which this invention relates will recognize various alternative designs and embodiments for practicing the invention as defined by the following claims.

What is claimed:

1. An imaging processing system adapted for use with a vehicle; the system comprising:
   an image capturing device being configured to capture an original image of a scene exterior to the vehicle, the captured original image being defined by a group of pixels; and
   an image processing device being configured to:
      receive the captured original image to remove distortion from the captured original image to produce a final filtered image;
      generate a structural element having a predetermined shape and size;
      scan the entire group of pixels in the original image with the structural element to generate a morphological filtered image;
      subtract the morphological filtered image from the captured original image to produce a difference image; and
      subtract the difference image from the captured original image to produce the final filtered image.

2. The image processing system of claim 1, wherein the image processing device is configured to remove distortion from the captured original image due to fog being present in the scene as being captured in the captured original image.

3. The image processing system of claim 1, wherein the image processing device is further configured to generate the structural element having the predetermined shape and size based on the type of original image captured.

4. The image processing system of claim 1, wherein the structural element is positioned around one or more pixels in the group of pixels.

5. The image processing system of claim 4, wherein the image processing device is configured to compare average pixel values of the one or more pixels in the structural element to one or more average pixel values of one or more pixels within a first sub group of pixels positioned in proximity to the structural element.

6. The image processing system of claim 5, wherein the image processing device is configured to replace the average pixel values for any one or more pixels in the first sub group of pixels with the average pixel value of the one or more pixels in the structural element for any of the average pixel values of the one or more pixels in the first sub group of pixels that exceed a predetermined threshold.

7. The image processing system of claim 6, wherein the image processing device is configured to slide the structural element through one or more additional sub groups of pixels until the entire group of pixels have been scanned and replace the average pixel values for any one or more pixels in the additional sub group of pixels with the average pixel value of the one or more pixels in the structural element for any of the average pixel values of the one or more pixels in the additional sub groups of pixels that exceeds the predetermined threshold.

8. The image processing system of claim 1, wherein the image capturing device is configured to capture the original image in a grey scale format.

9. The image processing system of claim 1, wherein the image capturing device is configured to capture the original image in a color format.

10. A method for image processing a captured original image in a vehicle, the method comprising:
    capturing the original image of a scene exterior to the vehicle;
    performing morphological image processing on the captured original image to remove distortion from the captured original image and to produce a final filtered image, wherein the operation of performing morphological image processing comprises:
    generating a structural element having a predetermined shape and size based on the type of image processed;
    filtering the captured original image with the structural element to produce a morphological filtered image;
    subtracting the morphological filtered image from the captured image to produce a difference image; and
    subtracting the difference image from the captured original image to produce the final filtered image.

11. The method of claim 10, wherein the step of capturing the original image further includes removing distortion from the captured original image due to fog being present in scene and captured in the original image.

12. An imaging processing apparatus adapted for use with a vehicle; the system comprising:
    an image processing device being configured to:
       receive a captured original image from an image capturing device, the capture original image being defined by a group of pixels and corresponding to a captured original image of a scene exterior to the vehicle;
       remove distortion from the captured original image to produce a final filtered image;
       generate a structural element having a predetermined shape and size;
       scan the entire group of pixels in the original image with the structural element to generate a morphological filtered image;
       subtract the morphological filtered image from the captured original image to produce a difference image; and
       subtract the difference image from the captured original image to produce the final filtered image.

13. The image processing apparatus of claim 12, wherein the image processing device is further configured to remove distortion from the captured original image due to fog being present in the scene as being captured in the captured original image.

14. The image processing apparatus of claim 12, wherein the image processing device is further configured to generate the structural element having the predetermined shape and size based on the type of original image captured.

15. The image processing apparatus of claim 12, wherein the structural element is positioned around one or more pixels in the group of pixels.

16. The image processing apparatus of claim 15, wherein the image processing device is further configured to compare average pixel values of the one or more pixels in the structural element to one or more average pixel values of one or more pixels within a first sub group of pixels positioned in proximity to the structural element.

17. The image processing apparatus of claim 16, wherein the image processing device is further configured to replace the average pixel values for any one or more pixels in the first sub group of pixels with the average pixel value of the one or more pixels in the structural element for any of the average pixel values of the one or more pixels in the first sub group of pixels that exceed a predetermined threshold.

18. The image processing apparatus of claim 17, wherein the image processing device is further configured to slide the structural element through one or more additional sub groups of pixels until the entire group of pixels have been scanned and replace the average pixel values for any one or more pixels in the additional sub group of pixels with the average pixel value of the one or more pixels in the structural element for any of the average pixel values of the one or more pixels in the additional sub groups of pixels that exceeds the predetermined threshold.

19. The image processing apparatus of claim 12, wherein the image capturing device is further configured to capture the original image in a grey scale format.

20. The image processing apparatus of claim 12, wherein the image capturing device is further configured to capture the original image in a color format.

* * * * *